(12) United States Patent
Ghouti et al.

(10) Patent No.: US 8,190,892 B2
(45) Date of Patent: May 29, 2012

(54) MESSAGE AUTHENTICATION CODE WITH BLIND FACTORIZATION AND RANDOMIZATION

(75) Inventors: Lahouari Ghouti, Dhahran (SA); Mohammad K. Ibrahim, Leicester (GB)

(73) Assignee: King Fahd University of Petroleum & Minerals, Dhahran (SA)

( * ) Notice: Subject to any disclaimer, the term of this patent is extended or adjusted under 35 U.S.C. 154(b) by 799 days.

(21) Appl. No.: 12/318,404

(22) Filed: Dec. 29, 2008

(65) Prior Publication Data

US 2010/0169657 A1 Jul. 1, 2010

(51) Int. Cl.
 *H04L 9/32* (2006.01)
(52) U.S. Cl. ........................................ 713/168; 713/181
(58) Field of Classification Search ................... 713/168, 713/181; 380/1, 259
 See application file for complete search history.

(56) References Cited

U.S. PATENT DOCUMENTS

| | | | |
|---|---|---|---|
| 4,991,210 A | 2/1991 | Chaum | |
| 6,282,295 B1 | 8/2001 | Young et al. | |
| 6,389,136 B1 | 5/2002 | Young et al. | |
| 7,000,110 B1 | 2/2006 | Terao | |
| 7,088,821 B2 | 8/2006 | Shaik | |
| 7,200,225 B1 | 4/2007 | Schroeppel | |
| 2002/0186848 A1 | 12/2002 | Shaik | |
| 2004/0111615 A1* | 6/2004 | Nyang et al. | 713/168 |
| 2005/0005125 A1 | 1/2005 | Zhang et al. | |
| 2005/0018851 A1 | 1/2005 | Venkatesan et al. | |
| 2005/0069135 A1 | 3/2005 | Brickell | |
| 2006/0013389 A1 | 1/2006 | Harrison et al. | |
| 2006/0117181 A1 | 6/2006 | Brickell | |
| 2007/0076865 A1 | 4/2007 | Lauter et al. | |
| 2007/0245147 A1* | 10/2007 | Okeya | 713/181 |
| 2008/0104387 A1* | 5/2008 | Owhadi et al. | 713/2 |

* cited by examiner

*Primary Examiner* — Nabil El Hady
(74) *Attorney, Agent, or Firm* — Richard C. Litman

(57) ABSTRACT

The message authentication code with blind factorization and randomization is a computational method for improving the security of existing Message Authentication Code (MAC) methods through the use of blind integer factorization. Further, blind randomization is used as a countermeasure to minimize collision attacks where different plaintexts produce the same MAC.

20 Claims, No Drawings

MESSAGE AUTHENTICATION CODE WITH BLIND FACTORIZATION AND RANDOMIZATION

BACKGROUND OF THE INVENTION

1. Field of the Invention

The present invention relates to computerized cryptographic methods, and particularly to a message authentication code with blind factorization and randomization.

2. Description of the Related Art

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible, to cryptanalyze. In this regard, the third party could intercept, or otherwise improperly access, a ciphertext message, then substitute a predefined illicit ciphertext block(s) which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication is not confined to Internet messages. With the burgeoning use of stand-alone personal computers, individuals or businesses often store confidential information within the computer, with a desire to safeguard that information from illicit access and alteration by third-parties. Password controlled access, which is commonly used to restrict access to a given computer and/or a specific file stored thereon, provides a certain, but rather rudimentary, form of file protection. Once password protection is circumvented, a third party can access a stored file and then change it, with the owner of the file then being completely oblivious to any such change.

Therefore, a need exists for a cryptographic technique that not only provides an extremely high level of security against cryptanalysis, particularly given the sophistication and power of current and future processing technology, but which is also capable of detecting a change made to a ciphertext message. Such a technique could be applied to (but is not limited in its use) secure file storage or safeguarding messages transmitted over an insecure network.

Systems and methods which provide integrity checks based on a secret key are usually called message authentication codes (MACs). Typically, message authentication codes are used between two parties that share a secret key in order to authenticate information transmitted between these parties. An adversary should be unable (with significant probability) to produce any properly-authenticated message for any message which he or she has not yet seen. Typically, a party authenticates a message by appending to it the corresponding MAC. The receiving party then applies a verification procedure on the received message and its message authentication code to decide if the transmitted message is authentic. This may be accomplished by having the receiving party compute his or her own message authentication code and check to see whether the received and generated codes match.

Message authentication code methods are used widely in many applications to provide data integrity and data origin authentication. However, MACs provide weaker guarantees than digital signatures, as they can only be used in a symmetric setting, where the parties trust each other. In other words, MACs do not provide non-repudiation of origin. However, MACs are preferred over digital signatures because they are two to three orders of magnitude faster in implementation, and MAC results are four to sixteen bytes long compared to the forty to one hundred and twenty eight bytes for signatures.

In order to use a MAC, a sender and a receiver need to share a secret key k (a random bit string of n, bits with typical values for $n_k$ in the range of 56 to 128). In order to protect a message, the sender computes the MAC corresponding to the message, which is a bit-string of $n_{mac}$ bits, and appends this string to the message (typical values for $n_{mac}$ are between 32 and 64). The MAC is a complex function of every bit of the message and the key. On receipt of the message, the receiver recomputes the MAC and verifies that it corresponds to the transmitted MAC value.

With regard to the security of MAC algorithms, an opponent who tries to deceive the receiver still does not know the secret key. For this analysis, it is assumed that he knows the format of the messages, and the description of the MAC algorithm. His goal is to try to inject a fraudulent message and append a MAC value which will be accepted by the receiver. He can choose one of two attack strategies: a forgery attack or a key recovery attack. The forgery consists of predicting the value of $MAC_k(m)$ for a message m without initial knowledge of the shared key k. If the adversary can do this for a single message, he is said to be capable of "existential forgery". If the adversary is able to determine the MAC for a message of his choice, he is said to be capable of "selective forgery". Practical attacks often require that a forgery is verifiable; i.e., that the forged MAC is known to be correct beforehand with a probability near one.

A key recovery attack consists of finding the key k from a number of message/MAC pairs. Such an attack is more powerful than forgery, since it allows for arbitrary selective forgeries. Ideally, any attack allowing key recovery requires approximately $2^{n_k}$ operations (in this case, $n_k$ denotes the bit-length of k. Verification of such an attack requires $n_k/n_{mac}$ text-MAC pairs.

These attacks can be further classified according to the type of control an adversary has over the device computing the MAC value. In a chosen-text attack, an adversary may request and receive MACs corresponding to a number of messages of his choice, before completing his attack. For forgery, the forged MAC must be on a message different than any for which a MAC was previously obtained. In an adaptive chosen-text attack, requests may depend on the outcome of previous requests. It should be noted that in certain environments, such as in wholesale banking applications, a chosen message attack is not a very realistic assumption: if an opponent can choose a single text and obtain the corresponding MAC, he can already make a substantial profit. However, it is best to remain cautious and to require resistance against chosen text attacks.

In the following, various attacks on MACs are considered: brute force key searching, guessing of the MAC, a generic forgery attack, and attacks based on cryptanalysis. A brute force key search requires a few known message-MAC pairs (approximately $n_k/n_{mac}$, which is between one and four for most MAC algorithms). It is reasonable to assume that such a small number of message-MAC pairs is available. The opponent tries all the possible keys and checks whether they correspond to the given message-MAC pairs. Unlike the case of confidentiality protection, the opponent can only make use of the key if it is recovered within its active lifetime (which can be reasonably short). On the other hand, a single success during the lifetime of the system might be sufficient. This depends on a cost/benefit analysis; i.e., how much one loses as a consequence of a forgery. The only way to preclude a key search is to choose a sufficiently large key.

A second relatively simple attack is in the form of choosing an arbitrary fraudulent message, and appending a randomly chosen MAC value. Ideally, the probability that this MAC value is correct is equal to $\frac{1}{2}n_{mac}$ where $n_{mac}$ is the number of bits of the MAC value. This value should be multiplied with the expected profit corresponding to a fraudulent message, which results in the expected value of one trial. Repeated trials can increase this expected value, but in a good implementation, repeated MAC verification errors will result in a security alarm (i.e., the forgery is not verifiable). For most applications $n_{mac}$ is between 32 and 64, which is sufficient to make this attack uneconomical.

A generic forgery attack exploits the fact most MAC algorithms consist of the iteration of a simple compression function. The MAC input message m is padded to a multiple of the block size, and is then divided into t blocks denoted $m_1$ through $m_t$. The MAC involves a compression function f and an n-bit ($n \geq n_{mac}$) chaining variable $H_i$ between stage i-1 and stage i, such that $H_0=IV$; $H_i=f(H_{i-1}, m_i)$, where $1 \leq i \leq t$; and $MAC_k(m)=g(H_t)$. Here, g denotes the output transformation. The secret key may be employed in the IV, in f, and/or in g. For an input pair (m, m') with $MAC_k(m)=g(H_t)$ and $MAC_k(m')=g(H'_t)$, a collision is said to occur if $MAC_k(m)=MAC_k(m')$. This collision is termed an internal collision if $H_t=H'_t$, and an external collision if $H_t \neq H'_t$ but $g(H_t)=g(H'_t)$.

One form of general forgery attack applies to all iterated MACs. Its feasibility depends on the bit sizes n of the chaining variable and $n_{mac}$ of the MAC result, the nature of the output transformation g, and the number s of common trailing blocks of the known texts ($s \geq 0$). A simple way to preclude this attack is to append a sequence number at the beginning of every message and to make the MAC algorithm stateful. This means that the value of the sequence number is stored to ensure that each sequence number is used only once within the lifetime of the key. While this is not always practical, it has the additional advantage that it prevents replay attacks. To add more security against external collisions, the function g can include some form of additional randomization.

The above attacks assume that no shortcuts exist to break the MAC algorithm (either for forgery or for key recovery). Since most existing MAC algorithms are not based on mathematically known hard problems, it is now becoming increasingly important to have MAC methods that are based on mathematically known hard problems such as integer factorization and discrete logarithm problems.

There are, conventionally, three main approaches for MAC design that are based on: a hash function with a secret key; a block cipher with chaining (CBC-MAC); and a dedicated MAC. Compared to the number of block ciphers and hash functions, relatively few dedicated MAC algorithms have been proposed. The main reason for this is that security of dedicated MAC methods need to be evaluated from scratch in order to assess their robustness. On the other hand, the security of MAC methods that are based on well established primitives such as secure block ciphers or hash functions can be based on the security of these underlying primitives, and its security does not have to be assessed from scratch.

The availability of fast dedicated hash functions (such as MD4 and MD5, for example) has resulted in several proposals for MAC algorithms based on these functions. However, these hash functions are weaker than intended, thus they are currently being replaced by RIPEMD-160 and by SHA-1, even though these hash functions are not based on mathematically known hard problems.

One method of using hash functions for MAC is to use secret prefix and secret suffix methods such that $MAC_k(m)=h(k\|m)$ and $MAC_k(m)=h(m\|k)$. However, the first equation allows for extension attacks, and the second equation opens the possibility of off-line attacks.

Another method is the "secret envelope" method, which requires that $MAC_k(m)=h(k_1\|m\|k_2)$ (for example, Internet RFC 1828). For this method, a security proof may be performed based on the assumption that the compression function of the hash function is pseudo-random. While this is an interesting result, it should be pointed out that the compression function of most hash functions has not been evaluated with respect to this property. Further, $2^{n/2}$ known texts does not allow for a forgery or a key recovery attack. Additionally, MDx-MAC extends the envelope method by also introducing secret key material into every iteration. This makes the pseudo-randomness assumption more plausible. Moreover, it precludes the key recovery attack by extending the keys to complete blocks. HMAC is yet another variant of this methodology, which uses a nested construction (also with padded keys), such that $MAC_k(m)=h(k_2\|h(m\|k_1))$.

HMAC is used for providing message authentication in the Internet Protocol. The security of HMAC is guaranteed if the hash function is collision resistant for a secret value $H_o$, and if the compression function itself is a secure MAC for one block (with the secret key in the $H_i$ input and the message in the $m_i$ input). While these assumptions are weaker, it is believed that the latter assumption still requires further validation for existing hash functions. It is clear from the above that none of the current MACs based on hash functions are based on mathematically known relatively hard or difficult cryptographic problems.

Block ciphers are presently the most popular algorithms in use for providing data privacy. Block ciphers with a block size n and a key size k can be viewed as a family of permutations on the set of all n-bit strings, indexed by k-bit long encryption keys and possessing certain properties.

Some of the properties that are typically required of block ciphers are simplicity of construction and security. With regard to security, it is usually assumed that the underlying block cipher is secure and that the key size k is chosen so that an exhaustive key search is computationally infeasible. In practice, there are two issues to be considered with respect to security: (i) for a randomly chosen key k, it appears as a random permutation on the set of n-bit strings to any computationally bounded observer (i.e., one who does not have an unlimited amount of processing power available) who does not know k and who can only see encryption of a certain number of plaintexts x of their choice; and (ii) to achieve a so-called semantic security which is resistant to collision attacks such as birthday and meet-in-the-middle attacks.

Such attacks have been proven to reduce an exhaustive key search significantly against block ciphers. In practice, most data units (including any typical file, database record, IP packet, or email message) which require encryption are greater in length than the block size of the chosen cipher. This will require the application of the block cipher function multiple times. The encryption of many plaintext blocks under the same key, or the encryption of plaintexts having identical parts under the same key may leak information about the corresponding plaintext. In certain situations, it is impossible to achieve semantic security. The goal then is to leak the minimum possible amount of information.

A further property is scalability. Obviously, no block cipher can be secure against a computationally unbounded attacker capable of running an exhaustive search for the unknown value of k. Furthermore, the development of faster machines will reduce the time it takes to perform an exhaustive key search. There is always a demand for more secure ciphers. It will be advantageous to develop a block cipher which is scalable so that an increase in security can be achieved by simply changing the length of the key rather than changing the block cipher algorithm itself.

Another property is efficiency. It is obvious that block ciphers are made computationally efficient to encrypt and decrypt to meet the high data rates demands of current applications such as in multimedia. Furthermore, since speed of execution is also important, it is advantageous to have block cipher that can be implemented in parallel. Of further interest is random access. Some modes allow encrypting and decrypting of any given block of the data in an arbitrary message without processing any other portions of the message.

Keying material is also an important factor in block ciphers. Some modes require two independent block cipher keys, which leads to additional key generation operations, a need for extra storage space or extra bits in communication. Additionally, of interest, are counter/IV/nonce requirements. Almost all modes make use of certain additional values together with block cipher key(s). In certain cases, such values must be generated at random or may not be reused with the same block cipher key to achieve the required security goals. Further, pre-processing capability is another important factor in block ciphers The Data Encryption Standard (DES) is a public standard and is presently the most popular and extensively used system of block encryption. DES was adopted as a federal government standard in the United States in 1977 for the encryption of unclassified information. The rapid developments in computing technology in recent years, in particular the ability to process vast amounts of data at high speed, meant that DES could not withstand the application of brute force in terms of computing power. In the late 1990's, specialized "DES cracker" machines were built that could recover a DES key after a few hours by trying possible key values. As a result, after 21 years of application, the use of DES was discontinued by the United States in 1998.

A new data encryption standard called Advanced Encryption Standard (AES) was launched in 2001 in the United States, and it was officially approved with effect from May 26, 2002. However, AES has no theoretical or technical innovation over its predecessor, DES. The basic concept remains the same and, essentially, all that has changed is that the block size n has been doubled. The AES standard specifies a block size of 128 bits and key sizes of 128, 192 or 256 bits. Although the number of 128-bit key values under AES is about $10^{21}$ times greater than the number of 56-bit DES keys, future advances in computer technology may be expected to compromise the new standard in due course. Moreover, the increase in block size may be inconvenient to implement.

Furthermore, AES is not based on known computationally difficult problems, such as performing factorization or solving a discrete logarithm problem. It is known that encryption methods that are based on known cryptographic problems are usually stronger than those that are not based on such problems. Also, AES provides a limited degree of varying security, 128-bits, 192-bits and 256-bits; i.e., it not truly scalable. It should noted that to have a cipher with a higher degree of security, the cipher would probably need a completely new algorithm which will make the hardware for AES redundant. As a clear example, the hardware for DES cannot be used efficiently for AES. Also, the hardware of the 192-bits AES cipher is not completely compatible with the hardware of the other two ciphers 128-bits and 256-bits.

There are many ways of encrypting data stream that are longer than a block size, where each is referred to as a "mode of operation". Two of the standardized modes of operation employing DES are Electronic Code Book (ECB), and Cipher Block Chaining (CBC). It should be noted that the security of a particular mode should in principle be equivalent to the security of the underlying cipher. For this, we need to show that a successful attack on the mode of operation gives us almost an equally successful attack on the underlying cipher.

With regard to the ECB mode, in order to encrypt a message of arbitrary length, the message is split into consecutive n-bit blocks, and each block is encrypted separately. Encryption in ECB mode maps identical blocks in plaintext to identical blocks in ciphertext, which obviously leaks some information about plaintext. Even worse, if a message contains significant redundancy and is sufficiently long, the attacker may get a chance to run statistical analysis on the ciphertext and recover some portions of the plaintext. Thus, in some cases, security provided by ECB is unacceptably weak. ECB may be a good choice if all is need is protection of very short pieces of data or nearly random data. A typical use case for ECB is the protection of randomly generated keys and other security parameters.

With regard to CBC mode, in this mode the exclusive—or (XOR) operation is applied to each plaintext block and the previous ciphertext block, and the result is then encrypted. An n-bit initialization vector IV is used to encrypt the very first block. Unlike ECB, CBC hides patterns in plaintext. In fact, it can be proved that there is a reduction of security of CBC mode to security of the underlying cipher provided that IV is chosen at random. The computational overhead of CBC is just a single XOR operation per block encryption/decryption, so its efficiency is relatively good. Further, CBC provides random read access to encrypted data; i.e., to decrypt the i-th block, we do not need to process any other blocks. However, any change to the i-th message block would require re-encryption of all blocks with indexes greater than i. Thus, CBC does not support random write access to encrypted data.

The most serious drawback of CBC is that it has some inherent theoretical problems. For example, if $M_i$ denotes the i-th plaintext block and $C_i$ denotes the i-th ciphertext block, if one observes in a ciphertext that $C_i = C_j$, it immediately follows that $M_i \text{ XOR } M_j = C_{i-1} \text{ XOR } C_{j-1}$, where the right-hand side of the equation is known. This is called the "birthday" or matching ciphertext attack. Of course, if the underlying cipher is good in the sense of pseudorandom permutation, and its block size is sufficiently large, the probability of encountering two identical blocks in ciphertext is very low.

Another example of its security weakness is its use of XOR-based encryption. A further drawback of CBC is that its randomization must be synchronized between the sending and the receiving correspondent. CBC uses an initialization vector that must be generated at random. This initialization vector must be synchronized between the sending and receiving correspondent for correct decryption.

From the above, it is clear that the security of encrypting a sequence of message blocks using a block cipher depends on two aspects: the security of the underlying block cipher; and the effectiveness of the randomization used in reducing collision attacks when encrypting a sequence of blocks.

With regard to the security of the underlying block cipher, it is known that encryption methods that are based on computationally hard problems, such as performing factorization or solving a discrete logarithm problem, are usually stronger than those that are not based on such problems. Integer factorization can be formulated as follows: For an integer n that is the product of two primes p and q, the problem is to find the values of p and q given n only. The problem becomes harder for larger primes. The discrete logarithm problem can be formulated as follows: Given a value g and a value y whose value is equal to $g^k$ defined over a group, find the value of k. The problem becomes harder for larger groups. Although the applications of integer factorization and discrete logarithm problems in designing block ciphers is known, the resulting ciphers are computationally more demanding than those currently used, such as AES.

With regard to the effectiveness of randomization and semantic security, the one time pad is the only unconditionally semantically secure cipher presently in use. With the one time pad, the sequence of keys does not repeat itself. In other words, it is said to have an infinite cycle. However, since the sending and the receiving correspondents have to generate the same random sequence, the one time pad is impractical because of the long sequence of the non-repeating key. As a consequence, the keys to encrypt and decrypt in all private-key systems, including block ciphers, remain unchanged for every message block, or they are easily derived from each other by inference using identical random number generators at the sending and receiving correspondent. Furthermore, these generators must be initialized to the same starting point at both correspondents to ensure correct encryption and decryption. This is true of all the existing block ciphers, including the RNS encryption and decryption method discussed above.

Many methods have been proposed to construct a pseudo-random number generator or adaptive mechanisms for pseudo-random generation of permutations. Such methods include those based on tables that are used to increase randomization. However, no matter how good the randomization property of the underlying generator, it always has a finite number of states and, hence, the numbers generated by existing generators have a finite cycle where a particular sequence is repeated one cycle after other. Therefore, such block ciphers are vulnerable to collision attacks. Thus, the security of such block ciphers is very much dependant on the randomness of the random number generator. The RNS encryption and decryption method described above is not an exception. As a consequence, one can conclude that semantic insecurity is inherent in all existing block ciphers, but with varying degrees.

It the following, existing ciphers where both the sending and the receiving correspondents have to generate the same random sequence will be referred to as synchronized-randomization ciphers. Synchronized-randomization is achieved under the control of a key or some form of an initialization mechanism. Starting from this initial value, subsequent keys are easily obtained by some form of a random number generator. Therefore, synchronized-randomization between encryption and decryption is guaranteed as long as identical random number generators are used by both correspondents and as long as the generators at both correspondents are synchronized to start from the same initial state. Thus, no unilateral change in the randomization method is allowed in synchronized-randomization.

With regard to MACs based on block ciphers, the most popular presently used MAC algorithm is the CBC-MAC; it has been adopted by many standardization committees including ANSI and ISO/IEC. It is widely used with DES as the underlying block cipher. CBC-MAC is an iterated MAC, with the following compression function: $H_i=E_k(H_{i-1} \oplus m_i)$, where $1 \leq i \leq t$. Here, $E_k(x)$ denotes the encryption of x using the $n_k$ bit key k with an n-bit block cipher E and $H_o=0$. The MAC is then computed as $MAC_k(m)=g(H_t)$, where g is the output transformation.

A widely used alternative is to replace the processing of the last block with a two-key triple encryption (with keys $k_1=k$ and $k_2$); this is commonly known as the ANSI retail MAC: $g(H_t)=E_{k_1}(D_{k_2}(H_t))=E_{k_1}(D_{k_2}(E_{k_1}(m_t \oplus H_{t-1})))$. Here, D denotes decryption. This mapping requires little overhead, and has the additional advantage that it precludes an exhaustive search against the 56-bit DES key. A second alternative is the use of a derived key k' (as opposed to a second independent key): $g(H_t)=E_{k'}(H_t)=E_{k'}(E_k(m_t \oplus H_{t-1}))$. All of these variants, however, are vulnerable to forgery attack, which requires a single chosen message and approximately $2^{n/2}$ known messages (for DES, this corresponds to $2^{32}$ known messages). For m>n, an additional $2^{n_{mac}-n}2$ chosen messages are required, which makes the attack less realistic. For the ANSI retail MAC, one does not only obtain a forgery, but one can also recover the key in time $3.2^{n_k}$ encryptions, compared to $2^{2n_k}$ encryptions for exhaustive search. If DES is used, this implies that key recovery may become feasible. Another key recovery attack needs only a single known text, but requires about $2^{n_k}$ MAC verifications. Moreover, it reduces the effective MAC size from m to $min(n_{mac}, n_k)$. The security of the ANSI retail MAC against key recovery attacks can be improved at no cost in performance by introducing a double DES encryption in the first and last iteration. This method of improvement requires: $H_i=E_{k_1}(E_{k_1'}(m_1))$ and $g(H_t)=E_{k_2'}(H_t)$. Here, $k_2'$ is derived from $k_2$.

An alternative to CBC-MAC is RIPE-MAC, which adds a feedforward: $H_i=E_k(H_{i-1} \oplus m_i) \oplus m_i$, where $1 \leq i \leq t$. This has the advantage that the round function is harder to invert (even for someone who knows the secret key). An output transformation is needed as well. XOR-MAC is another scheme based on a block cipher. It is a randomized algorithm and its security can again be reduced to that of the block cipher. It has the advantage that it is parallellizable and that small modifications to the message (and to the MAC) can be made at very low cost. The use of random bits helps to improve security, but it has a cost in practical implementations. Further, performance is typically 25% to 50% slower than CBC-MAC.

As noted above, the strength of MAC based on block cipher is dependant on the security of the underlying block cipher. Further, none of the current block ciphers are based on a known cryptographically hard problem.

Block ciphers may also be based on the Residue Number System (RNS). In RNS, the vector $\{p_1, p_2, \ldots, p_L\}$ forms a set of moduli, termed the RNS "basis β", where, the moduli $\{p_1, p_2, \ldots, p_L\}$ are relatively prime with respect to each other. P is the product $$\prod_{l=1}^{L} p_l$$

and defines the dynamic range of the system. The vector $\{m_1, m_2, \ldots, m_L\}$ is the RNS representation of an integer M, which is less than P, where $m_l = <M>_{p_l} = M \bmod_{p_l}$. Any integer M belonging to the set $\{0, \ldots, P-1\}$ has a unique representation in the basis $\beta$.

The operations of addition, subtraction, and multiplication are defined over the set $\{0, \ldots, P-1\}$ as: $C \pm D = (<c_1 \pm d_1>_{p_1}, \ldots <c_L \pm d_L>_{p_L})$ and $C \times D = (<c_1 \times d_1>_{p_1}, \ldots <c_L \times d_L>_{p_L})$. These equations illustrate the parallel carry-free nature of RNS arithmetic.

The reconstruction of M from its residues $\{m_1, m_2, \ldots, m_L\}$ is based on the Chinese Remainder Theorem (CRT):

$$M = \left\langle \sum_{l=0}^{L} <\mu_l m_l>_{p_l} P_l \right\rangle_P, \quad (1)$$

where $$P = \prod_{l=1}^{L} p_l; \quad (2)$$

$$P_l = \frac{P}{p_l}; \text{ and} \quad (3)$$

$$\mu_l = <P_l^{-1}>_{p_l}. \quad (4)$$

The vector $\{m_1', m_2', \ldots, m_L'\}$, where $0 \leq m_l' < p_l$, is the Mixed Radix System (MRS) representation of an integer M less than P, such that, $$M = m_1' + m_2' p_1 + m_3' p_1 p_2 + \ldots + m_L' \prod_{l=1}^{L-1} p_l.$$

With regard to equations (1)-(4), a change in any one of the residue values $m_l$ can have an effect on the whole number, M.

RNS encryption and decryption is known. One such method is taught by U.S. Pat. No. 5,077,793, which is herein incorporated by reference. In U.S. Pat. No. 5,077,793, the sending and receiving correspondents perform the following steps:

agreeing on a set of elements $\{p_1, p_2, \ldots, p_L\}$ which are relatively prime with respect to each other and that are used as the RNS basis $\beta$;

agreeing on a set of L random number generators modulo $p_l$, $i=1, \ldots, L$; and agreeing on a shared key which is used for the synchronized initialization of the random number generators by both the sending and receiving correspondents so that they can start generating random numbers from the same starting point.

The sending correspondent then performs the following steps:

converting the integer value $M_i$ of the bit-string of the i-th message block into RNS representation $\{m_{i,1}, m_{i,2}, \ldots, m_{i,L}\}$ using the basis $\beta$;

using a set of L random number generators modulo $p_l=1, \ldots, L$ and the shared key to generate the i-th set of random numbers $r_{i,l}$, $l=1, \ldots, L$;

performing the addition $c_{i,l} = m_{i,l} + r_{i,l}$ for $l=1, \ldots, L$;

converting the integer vector $\{c_{i,1}, c_{i,2}, \ldots, c_{i,l}\}$ into an integer value $C_i$ using the CRT and the basis $\beta$; and sending the integer value $C_i$ to the receiving correspondent.

The receiving correspondent performs the following steps:

converting the integer value $C_i$ of a message string into the RNS representation $\{c_{i,1}, c_{i,2}, \ldots, c_{i,l}\}$ using the basis $\beta$;

using a set of L random number generators modulo $p_l$, $i=1, \ldots, L$ and the shared key to generate random numbers $r_{i,l}$, $l=1, \ldots, L$;

performing the subtraction $m_{i,l} = c_{i,l} - r_{i,l}$ for $l=1, \ldots, L$;

converting the integer vector $\{m_{i,1}, m_{i,2}, \ldots, m_{i,L}\}$ into an integer value $M_i$ using the CRT and the basis $\beta$; and recovering the bit string of the i-th message block from the integer value $M_i$.

In the above, elements of the RNS basis can be changed for successive blocks, but the key must indicate the set of elements used. The method also to uses a mixed radix representation to both speed up conversion and to introduce further complexity to the basic RNS encryption method.

The above method is designed to achieve a more efficient random number generation and exploit the advantage of performing modulo addition in the RNS domain. However, the latter advantage is lost due to the use of the CRT to convert from RNS to binary representation, which is performed at the sending correspondent and the receiving correspondent before the transmission of the ciphertext. It is well known that RNS representation is effective when many of the computations of the method can be performed in the RNS domain, since the size of this RNS computation is far greater than the overhead of the CRT computation. In the RNS encryption and decryption method discussed above, only one addition is performed in the RNS domain. As a result, the computational advantage of using RNS is lost both at the sending correspondent and the receiving correspondent.

Further, performing addition in the RNS domain in the above method is equivalent to performing $C_i = M_i + R_i \bmod P$, where R is a random integer number obtained from the integer vector $\{r_1, r_2, \ldots, r_L\}$ using the CRT, and $$P = \prod_{l=1}^{L} p_l.$$

Therefore, patterns in the ciphertext values $C_i$ can be studied in the binary domain without the need to convert these values to the RNS domain. Thus, a cryptanalyst can attack the above RNS encryption in the binary domain rather in the RNS domain. This implies that neither knowledge of the value P nor knowledge of the elements $\{p_1, p_2, \ldots, p_L\}$ are needed to perform cryptanalysis of the above method, which can be just as easily performed in the binary domain.

There is, in fact, an advantage in performing the cryptanalysis in the binary domain. In the above, random number generation is performed in the RNS domain rather than in the binary domain. The reason for this is that random numbers generated in the binary domain with uniform distribution do not guarantee uniform distribution of the composite modulo numbers in the RNS domain. However, in a reciprocal analogy, generating random numbers in the RNS domain with uniform distributions does not guarantee a uniform distribution in the binary domain. This makes randomization generated in the RNS domain easier to attack in the binary domain. Therefore, it is more advantageous for an attacker to perform the cryptanalysis of the above RNS method in the binary domain rather than in the RNS domain, thus bypassing the use of the RNS representation altogether. This illustrates a weakness in generating random numbers in the RNS domain. The usage of the RNS representation in the above makes the ciphertext more vulnerable to collision attacks and easier to attack in the binary domain. It should be noted that performing the attack in the binary domain implies that neither knowledge of the value P nor knowledge of the elements $\{p_1, p_2, \ldots, p_L\}$ are required.

In effect, the security of the above protocol is only dependant upon protecting the shared secret key which is used for identifying the starting point of the random number generators at both the sending and receiving correspondents. Since the above cipher is equivalent to a simple modulo addition of a plaintext with a random number, breaking the shared key is relatively not difficult using exhaustive search attacks with present computers.

Thus, a message authentication code with blind factorization and randomization solving the aforementioned problems is desired.

SUMMARY OF THE INVENTION

The message authentication code with blind factorization and randomization is a computational method for improving the security of existing Message Authentication Code (MAC) methods through the use of blind integer factorization. Further, blind randomization is used as a countermeasure to minimize collision attacks where different plaintexts produce the same MAC.

A method of generating the message authentication code includes the steps of:

a) a pair of sending and receiving correspondents agreeing upon on a set of elements $\{p_1, p_2, \ldots, p_L\}$ which are relatively prime with respect to one another, which are further considered as a shared secret and which are further used to form a basis $\beta=\{p_1, p_2, \ldots, p_L\}$ the sending and receiving correspondents further agreeing upon an integer $g_l \epsilon Z_{p_l}$ for each element $p_l$, $l=1, \ldots, L$, wherein $Z_p$ denotes the set $\{0, \ldots, p\}$ and L is an integer that denotes the number of prime number used in the basis $\beta$, and wherein N is maximum number of bits of a message data block, wherein the value of N is dependent on the data embedding method that is also agreed upon by the sending and receiving correspondent, and wherein the message data bit string is a multiple of N such that $(u+1)N$, wherein u is an integer, the sending and receiving correspondents further agreeing upon an upper limit for the number of bits to be used to represent the message authentication code and an initial vector for a set of message authentication code elements $c_{-i,l}$, $l=1, \ldots, L$;

the sending correspondent then performing the following steps:

b) initializing an integer i as i=0, the following steps c) to d) then being repeated until i>u:

c) generating L integer values $k_l$, where $l=1, \ldots, L$, such that $0 \leq k_l < p_l$ from the $l^{th}$ block of the message bit string using a data embedding method;

d) computing the message authentication code elements $c_{i,l}$ modulo $p_l$ as $c_{i,l}=f_l(c_{i-1,l}, g_l, k_{i,l})$ for $l=1, \ldots, L$, wherein $f_l(,)$ represents a modulo p function;

e) combining the integer values $c_{u,l}$ for $l=1, \ldots, L$ to form a single integer vector $\{c_{u,1}, c_{u,2}, \ldots c_{u,L}\}$;

f) converting the integer vector $\{c_{u,1}, c_{u,2a}, \ldots, c_{u,L}\}$ into an integer value C using the basis $\beta$ and the Chinese Remainder Theorem, the integer value C being the message authentication code value, g) appending the bit string of the message authentication code integer value, C, to the message bit string and sending the concatenated bit string to the receiving correspondent;

the receiving correspondent then performs the following steps:

h) obtaining the message authentication code integer value C from the received message bit string;

i) computing the message authentication code elements $C_{u,l}$ modulo $p_l$ as $c_{u,l}$=C mod $p_l$ for $l=1, \ldots, L$;

j) initializing the integer i as i=0, then repeating the following steps k) to l) until i>u:

k) generating L integer values $k_l$, where $l=1, \ldots, L$ such that $0 \leq k_l < p_l$ from the $l^{th}$ block of the received message bit string using the data embedding method;

l) computing the message authentication code elements $rc_{i,l}$ modulo $p_l$ as $rc_{i,l}=f_l(rc_{i-1,l}, g_l, k_{i,l})$ for $l=1, \ldots, L$; and m) if $c_{u,l}=rc_{u,l}$ for all l, then the received message is authenticated.

These and other features of the present invention will become readily apparent upon further review of the following specification and drawings.

DETAILED DESCRIPTION OF THE PREFERRED EMBODIMENTS

The message authentication code with blind factorization and randomization is a computational method for improving the security of existing Message Authentication Code (MAC) methods through the use of blind integer factorization. Further, blind randomization is used as a countermeasure to minimize collision attacks where different plaintexts produce the same MAC.

Blind integer factorization is performed using the following: For an unknown integer P with a known upper bound, the prime numbers $p_l$, $l=1, \ldots, L$, are found such that $$P = \prod_{l=1}^{L} p_l.$$

Blind integer factorization is, essentially, the factorization of an unknown integer into its prime factors using only knowledge about the upper bound of the integer. In contrast, conventional integer factorization is performed as follows: given a known integer P, the prime numbers $p_l$, $l=1, \ldots, L$, are found such that $$P = \prod_{l=1}^{L} p_l.$$

Blind integer factorization is a computationally more difficult problem than the conventional "known integer" factorization problem since, in blind integer factorization, the integer P to be factorized is not known.

Thus, blind integer factorization problem is a more general problem than factoring a known integer P into its prime factors. It should be noted that only the upper bound of the integer P could be known to an attacker, but the actual value of P remains unknown.

In the following, MAC methods based on blind integer factorization are performed using the Residue Number Representation (RNR) and the Chinese Remainder Theorem (CRT). In the following, cryptanalysis is forced to work in the RNS domain. This is achieved by generating the MAC elements in the RNS domain first and then converting the MAC to binary representation using the Chinese Remainder Theorem. As a result, an attacker is forced to perform the analysis in the RNS domain. Thus, an attacker has to perform blind integer factorization in order to perform cryptanalysis of the disclosed MAC methods.

Blind randomization is the ability to randomize the MAC of plaintext without the need for the receiving correspondent to know the randomization mechanism of the sending correspondent. The basic principle used is allowing the sending correspondent to unilaterally change the randomization mechanism without affecting the ability of the receiving correspondent to authenticate the plaintext. In other words, there is no need for synchronized randomization between the sending and the receiving correspondent. It should be noted that blind randomization is used here to randomize the MAC in order to minimize collision attacks where different plaintexts generate the same MAC.

Blind randomization is used either to randomize the RNS basis used to generate the MAC; to use additional elements in the RNS basis for randomizing the MAC; or as a combination of both. Blind randomization allows the sending correspondent to truly randomize the MAC by being able to change the random number generation mechanism without concern for any synchronization with the receiving correspondent. The receiving correspondent does not need to be informed of how the randomization was achieved at the sending correspondent.

This ability to authenticate plaintext at the receiving entity independently of the randomization used at the sending correspondent is a significant countermeasure against collision attacks. This is because the sending correspondent can change the way randomization is injected into the ciphertext without the need to synchronize with the receiving correspondent.

As will be described in greater detail below, in one embodiment, the sending correspondent can unilaterally select different elements for the RNS basis from an agreed upon set of relatively prime numbers. The sending codependent needs only to send the code which identifies which sub-set of elements is being used. This will allow the MAC of the same message to be calculated using a different basis, thus reducing the probability of collision.

In a further embodiment, not all the modulo integers that correspond to the elements of the RNS basis are used to represent the message data strings. Some of these modulo integers are used to randomize the corresponding MAC. Further, each random modulo number can be generated using a different random number generator, thus increasing the degree of randomization. Additionally, the sending correspondent can vary the elements of the RNS basis used to randomize the ciphertext without the need to send any further information about them to the receiving correspondent.

Additionally, as will be described in greater detail below, the present methodology improves the efficiency of RNS-based MAC methods by requiring the Chinese Remainder Theorem to be performed at the sending correspondent only. This has the advantage of reducing the amount of computations needed at the receiving correspondent, which could be a device that has limited power resources, such as a wireless or mobile terminal. Further, it should be noted that the below MAC methods are scalable. Scalability is achieved by using larger prime numbers or using more elements in the RNS basis.

In the below, the symbol $\in$ denotes set membership, "gcd" denotes the greatest common divisor, and $Z_p$ is used to denote the set $\{0, \ldots, p-1\}$. Further, in the following it is assumed that the maximum block size that can be embedded into the L residue values $\{k_1, k_2, \ldots, k_L\}$ is N, and that the message data bit string length is a multiple of N, such as $(u+1)N$. In other words, the number of N-bit blocks in a message bit string is $(u+1)$.

A first embodiment of the RNS-based encryption method is as follows:

a) the sending and receiving correspondents agree upon on a set of elements $\{p_1, p_2, \ldots, p_L\}$ that are relatively prime with respect to one another, which are further considered as a shared secret and which are further used to form a basis $\beta = \{p_1, p_2, \ldots, p_L\}$ the sending and receiving correspondents further agree upon an integer $g_l \in Z_{p_l}$ for each element $p_l$, $l=1, \ldots, L$, wherein these integers are part of the shared secret key or they could be made public, the sending and receiving correspondents further agreeing upon an upper limit for the number of bits to be used to represent the message authentication code and an initial vector for the message authentication code elements $c_{-1,l}$, $l=1, \ldots, L$.

The sending correspondent performs the following steps:

b) initializing an integer i as i=0, the following steps c) to d) are repeated until i>u:

c) generating from an integer value $M_i$ of a bit string of the i-th block of the message L integer values $k_{i,l}$, wherein $l=1, \ldots, L$, such that $0 \leq k_{0,i} < p_l$ as $k_{i,l} = M_i \bmod p_l$ for $l=1, \ldots, L$;

d) computing the message authentication code elements $c_{i,l}$ modulo $p_l$ as $c_{i,l} = f_l(c_{i-1,l}, g_l, k_{i,l})$ for $l=1, \ldots, L$, wherein $f_l(,)$ represents a modulo p function;

e) combining the integer values $c_{u,l}$ for $l=1, \ldots, L$ to form a single integer vector $\{c_{u,1}, c_{u,2}, \ldots, c_{u,L}\}$;

f) converting the integer vector $\{c_{u,1}, c_{u,2}, \ldots, c_{u,L}\}$ into an integer value C using the basis $\beta$ and the Chinese Remainder Theorem, the integer value C being the message authentication code value;

g) appending the message authentication code integer value, C, to the message bit string and sending the concatenated bit string to the receiving correspondent.

The receiver correspondent then performs the following steps:

h) obtaining the message authentication code integer value C from the received message bit string;

i) computing the message authentication code elements $c_{u,l}$ modulo $p_l$ as $c_{u,l} = C \bmod p_l$ for $l=1, \ldots, L$;

j) initializing the integer i as i=0, then repeating the following steps k) to l) until i>u:

k) generating from the integer value $Mr_i$ of the bit string of the i-th block of the received message L integer values $k_{i,l}$, where $l=1, \ldots, L$, such that $0 \leq k_{0,i} < p_l$ as $k_{i,l} = Mr_i \bmod p_l$ for $l=1, \ldots, L$;

l) computing the message authentication code elements $rc_{i,l}$ modulo $p_l$ as $rc_{i,l} = f_l(rc_{i-1,l}, g_l, k_{i,l})$ for $l=1, \ldots, L$; and m) if $c_{u,l} = rc_{i,l}$ for all l, then the received message is authenticated.

It should be noted that in the above, the receiver does not need to compute the CRT, which is advantageous for low power devices. Further, as an alternative, the method may be varied by replacing the step of generating the L integer values with the data embedding method given below.

A further alternative embodiment utilizes blind randomization. Blind randomization is the ability to randomize the MAC of a plaintext without the need for the receiving correspondent to know the randomization mechanism of the sending correspondent. The basic principle used is to allow the sending correspondent to unilaterally change the randomization mechanism without affecting the ability of the receiving correspondent to authenticate the plaintext. In other words, there is no need for synchronized randomization between the sending and the receiving correspondent. It should be noted that blind randomization is used here to randomize the MAC in order to minimize collision attacks where different plaintexts generate the same MAC.

In the below, randomization is achieved by allowing the sending correspondent to unilaterally select the RNS basis to be used to generate the MAC from an agreed upon set of possible relatively prime numbers. The method includes the following steps:

a) a pair of sending and receiving correspondents agreeing upon on a set of elements $\{p_1, p_2, \ldots, p_L\}$ which are relatively prime with respect to one another and which are further considered as a shared secret, the sending and receiving correspondents further agreeing upon an integer $g_l \epsilon Z_{p_l}$ for each element $p_l$, $l=1, \ldots, L$, wherein $Z_p$ denotes the set $\{0, \ldots, p\}$ and L is an integer that denotes the number of prime numbers used in the basis $\beta$, and wherein N is maximum number of bits of a message data block, wherein the value of N is dependent on the data embedding method that is also agreed upon by the sending and receiving correspondent, and wherein the message data bit string is a multiple of N such that $(u+1)N$, wherein u is an integer, the sending and receiving correspondents further agreeing upon an upper limit for the number of bits to be used to represent the message authentication code and an initial vector for a set of message authentication code elements $c_{-1,l}$, $l=1, \ldots, L$, the sending and receiving correspondents further agreeing on a list of codes, wherein each code identifies a different sub set of $(L-1)$ elements out of a set of L shared secret elements, the sending and receiving correspondents further agreeing upon an element $p_L$ of the set $\{p_1, p_2, \ldots, p_L\}$, the element being used to carry information about the code used by the sending correspondent to select a sub-set of the elements $\{p_1', p_2', \ldots, p_L'\}$ which are used to form a basis, wherein the number of codes is $(p_L-1)$;

the sending correspondent then performing the following steps:

b) selecting a code at random from the list of agreed upon to select $(L-1)$ elements $\{p_1, p_2, \ldots, p_{L-1}\}$ from the elements $\{p_1, p_2, \ldots, p_L\}$ to form the basis $\beta_i = \{p_1, p_2, \ldots, p_{L-1}, p_L\}$;

c) initializing an integer i as $i=0$, the following steps d) to e) then being repeated until $i>u$:

d) generating $(L-1)$ integer values $k_{i,l}$, where $l=1, \ldots, (L-1)$ such that $0 \leq k_{i,l} < p_l$, from the i-th block of the message bit string using a data embedding method, as described below;

e) computing the message authentication code elements $c_{i,l}$ modulo $p_l$ as $c_{i,l} = f_l(c_{i-1,l}, g_l, k_{i,l})$ for $l=1, \ldots, (L-1)$, where $f_l(.)$ represents a modulo p function;

f) embedding the bit strings of the code used by the sending correspondent to select the $(L-1)$ elements $\{p_1, p_2, \ldots, p_{L-1}\}$ into the integer value $c_{u,L}$, such that $0 \leq c_{u,L} < p_L$, using the data embedding method, as described below;

g) combining the integer values $c_{u,l}$ for $l=1, \ldots, L$ to form a single integer vector $\{c_{u,1}, c_{u,2}, \ldots, c_{u,L}\}$;

h) converting the integer vector $\{c_{u,1}, c_{u,2}, \ldots, c_{u,L}\}$ into an integer value C using the basis $\beta$ and the Chinese Remainder Theorem, the integer value C being the message authentication code value;

i) appending the message authentication code integer value, C, to the message bit string and sending the concatenated bit string to the receiving correspondent;

the receiving correspondent then performs the following steps:

j) obtaining the message authentication code integer value C from the received message bit string;

k) computing a message authentication code element $c_{u,L}$, as the value $c_{u,L} = C \mod p_L$;

l) recovering the code used to define the set $\{p_1, p_2, \ldots, p_{L-1}\}$ from the value $c_{u,L}$;

m) computing the message authentication code elements $c_{u,l}$ modulo $p_l$ as $c_{u,l} = C \mod p_l$ for $l=1, \ldots, (L-1)$;

n) initializing the integer i as $i=0$, then repeating the following steps o) to p) until $i>u$:

o) generating $(L-1)$ integer values $k_{i,l}$, where $l=1, \ldots, (L-1)$, such that $0 \leq k_{i,l} < p_l$, from the i-th block of the message bit string using the data embedding method described below;

p) computing the message authentication code elements $rc_{i,l}$ modulo $p_l$ as $rc_{i,l} = f_l(rc_{i-1,l}, g_l, k_{i,l})$ for $l=1, \ldots, (L-1)$ and q) if $c_{u,l} = rc_{u,l}$ for $l=1, \ldots, (L-1)$, then the received message is authenticated.

In the following alternative embodiment, randomization is achieved by allowing the sending correspondent to unilaterally select extra relatively prime elements which are used in addition to the RNS elements that are used to generate the MAC. The extra relatively prime elements are used to randomize the MAC. The method includes the following steps:

a) the sending and receiving correspondents agree upon on a set of elements $\{p_1, p_2, \ldots, p_L\}$ that are relatively prime with respect to one another, which are further considered as a shared secret and which are further used to form a basis $\beta_s = \{p_1, p_2, \ldots p_L\}$, the sending and receiving correspondents further agree upon an integer $g_l \epsilon Z_{p_l}$ for each element $p_l$, $l=1, \ldots, L$, wherein these integers are part of the shared secret key or they could be made public, the sending and receiving correspondents further agreeing upon an upper limit for the number of bits to be used to represent the message authentication code and an initial vector for the message authentication code elements $c_{-1,l}$, $l=1, \ldots, L$.

The sending correspondent performs the following steps:

b) selecting elements $\{q_1', q_2', \ldots q_{J'}'\}$ wherein j' is an integer and $j'>0$, the elements being relatively prime with respect to one another and further being relatively prime with respect to the secret elements $\{p_1, p_2, \ldots, p_L\}$, the elements $\{q_1', q_2', \ldots, q_{J'}'\}$ being known to the sending correspondent only;

c) selecting a random sub-set of elements $\{q_{i,1}, q_{i,2}, \ldots q_{i,J}\}$ from the set $\{q_1', q_2', \ldots, q_{J'}'\}$ wherein the number of bits needed to represent $$\prod_{l=1}^{L} p_l \prod_{j=1}^{J} q_j$$

is within the upper limit agreed upon by the sending and receiving correspondents;

d) forming the basis $\beta = \{p_1, p_2, \ldots, p_L, q_1, q_2, \ldots, q_J\}$ using the elements $\{p_1, p_2, \ldots, p_{L-1}\}$ and the elements $\{q_1, q_2, \ldots, q_J\}$;

e) initializing an integer i as $i=0$, then repeating the following steps f) to g) until $i>u$:

f) generating L integer values $k_l$, where $l=1, \ldots, L$ such that $0 \leq k_l < p_l$ from the $l^{th}$ block of the received message bit string using a data embedding method;

g) computing the message authentication code elements $c_{i,l}$ modulo $p_l$ as $c_{i,l} = f_l(c_{i-1,l}, g_l, k_{i,l})$ for $l=1, \ldots, L$, wherein $f_l(.)$ represents a modulo p function;

h) generating j random values $r_j$, where $j=1, \ldots, J$, such that $0 \leq r_j < q_j$ for $j=1, \ldots, J$;

i) combining the integer values $c_{u,l}$ for $l=1, \ldots, L$ and the values $r_j$ for $j=1, \ldots, J$ to form a single integer vector $\{c_{u,1}, c_{u,2}, \ldots, c_{u,L}, r_1, r_2, \ldots, r_J\}$;

j) converting the integer vector $\{c_{u,1}, c_{u,2}, \ldots, c_{u,L}, r_1, r_2, \ldots, r_J\}$ into an integer value C using the basis $\beta$ and the Chinese Remainder Theorem, the integer value C being the message authentication code value;

k) appending the message authentication code integer value, C, to the message bit string and sending the concatenated bit string to the receiving correspondent.

The receiver correspondent then performs the following steps:

l) obtaining the message authentication code integer value C from the received message bit string;

m) computing the message authentication code elements $c_{u,l}$ modulo $p_l$ as $c_{u,l} = C \bmod p_l$ for $l=1, \ldots, L$;

n) initializing the integer i as $i=0$, then repeating the following steps o) to p) until $i > u$:

o) generating L integer values $k_l$, where $l=1, \ldots, L$ such that $0 \leq k_l < p_l$ from the $l^{th}$ block of the received message bit string using the data embedding method;

p) computing the message authentication code elements $rc_{i,l}$ modulo $p_l$ as $rc_{i,l} = f_l(rc_{i-1,l}, g_l, k_{i,l})$ for $l=1, \ldots, L$; and q) if $c_{u,l} = rc_{i,l}$ for all l, then the received message is authenticated.

It should be noted that the receiver does need to compute the CRT, which is advantageous for low power devices. Further, as an alternative, the method may be varied by replacing the step of generating the L integer values with the data embedding method given below.

A further alternative method includes the following steps:

The method includes the following steps:

a) the sending and receiving correspondents agree upon on a set of elements $\{p_1', p_2', \ldots, p_{L'}'\}$ that are relatively prime with respect to one another, which are further considered as a shared secret and which are to further used to form a basis $\beta_s = \{p_1, p_2, \ldots, p_L\}$, the sending and receiving correspondents further agree upon an integer $g_l \in Z_{p_l}$ for each element $p_l$, $l=1, \ldots, L$, wherein these integers are part of the shared secret key or they could be made public, the sending and receiving correspondents further agreeing upon a data embedding method and an upper limit for the number of bits to be used to represent the message authentication code and an initial vector for the message authentication code elements $c_{-1,l}$, $l=1, \ldots, L$, the sending and receiving correspondents further agreeing upon a list of codes where each code identifies a different sub-set of (L−1) elements out of the set of L' shared secret elements, and further agreeing upon agreeing on an element $p_L$ of the set $\{p_1', p_2', \ldots, p_{L'}'\}$ which is used to carry information about the code used by the sending correspondent to select a sub-set of elements $\{p_1', p_2', \ldots, p_{L'}'\}$ that are used to form the basis, where the number of codes is $(p_L - 1)$.

The sending correspondent then performs the following steps:

b) selecting a code at random from the list of codes agreed upon to select (L−1) elements $\{p_1, p_2, \ldots, p_{L-1}\}$ from the elements $\{p_1', p_2', \ldots, p_{L'}'\}$ to form the basis $\beta_l = \{p_1, p_2, \ldots, p_{L-1}, p_L\}$;

c) selecting elements $\{q_1', q_2', \ldots, q_{J'}'\}$ wherein J' is an integer and $J' > 0$, the elements being relatively prime with respect to one another and further being relatively prime with respect to the secret elements $\{p_1, p_2, \ldots, p_L\}$, the elements $\{q_1', q_2', \ldots, q_{J'}'\}$ being known to the sending correspondent only;

d) selecting a random sub-set of elements $\{q_{i,1}, q_{i,2}, \ldots, q_{i,J}\}$ from the set $\{q_1', q_2', \ldots, q_{J'}'\}$, wherein the number of bits needed to represent $$\prod_{l=1}^{L} p_l \prod_{j=1}^{J} q_j$$

is within the upper limit agreed upon by the sending and receiving correspondents;

e) forming the basis $\beta = \{p_1, p_2, \ldots, p_L, q_1, q_2, \ldots, q_J\}$ using the elements $\{p_1, p_2, \ldots, p_{L-1}\}$ and the elements $\{q_1, q_2, \ldots, q_J\}$;

f) initializing an integer i as $i=0$, then repeating the following steps g) to h) until $i > u$:

g) embedding message bit strings of the code used by the sending correspondent to select the (L−1) elements $\{p_1, p_2, \ldots, p_{L-1}\}$ into the integer value $c_{u,L}$, such that $0 \leq c_{u,L} < p_L$, using the data embedding method described below;

h) generating J random values $r_j$, where $j=1, \ldots, J$, such that $0 \leq r_j < q_j$ for $j=1, \ldots, J$;

i) combining the integer values $c_{u,l}$ for $l=1, \ldots, L$ and the values for $j=1, \ldots, J$ to form a single integer vector $\{c_{u,1}, c_{u,2}, \ldots, c_{u,L}, r_1, r_2, \ldots, r_J\}$;

j) converting the integer vector $\{c_{u,1}, c_{u,2}, \ldots, c_{u,L}, r_1, r_2, \ldots, r_J\}$ into an integer value C using the basis $\beta$ and the Chinese Remainder Theorem, the integer value C being the message authentication code value;

k) appending the message authentication code integer value, C, to the message bit string and sending the concatenated bit string to the receiving correspondent.

The receiver correspondent then performs the following steps:

l) obtaining the message authentication code integer value C from the received message bit string;

m) computing the message authentication code elements $c_{u,l}$ modulo $p_l$ as $c_{u,l} = C \bmod p_l$ for $l=1, \ldots, L$;

n) recovering the code used to define the set $\{p_1, p_2, \ldots, p_{L-1}\}$ from the value $c_{u,L}$;

o) computing the message authentication code elements $c_{u,l}$ modulo $p_l$ as $c_{u,-1} = C \bmod p_l$ for $l=1, \ldots, (L-1)$;

p) initializing the integer i as $i=0$, then repeating the following steps q) to r) until $i > u$:

q) generating (L−1) integer values $k_{i,l}$, for $l=1, \ldots, (L-1)$, such that $0 \leq k_{i,l} < p_l$, from the i-th block of the message bit string using the data embedding method given below;

r) computing the message authentication code elements $rc_{i,l}$ modulo $p_l$ as $rc_{i,l} = f_l(rc_{I-1,l}, g_l, k_{i,l})$ for $l=1, \ldots, L$; and s) if $c_{u,l} = rc_{u,l}$ for all l, then the received message is authenticated.

The above methods can also be applied to find the message authentication code for bit streams of media data, such as text, audio, video, or multimedia data. The application to media data involves using a pre-processing stage which is used to compress the media data prior to the application of the MAC method. Either a lossless compression method or a lossy compression method can be used to compress the media data in the pre-processing stage. The bit string of the compressed message at the output of the pre-processing stage is then used as the input to the above MAC generations methods.

As an alternative to using a compression method as a preprocessing stage, a feature selection method can be used to generate a message bit string that captures the main features that are present in the media data. For example, for images, the main features would be those that carry more perceptually important features, such as edges. As with the above, the output of the preprocessing stage would be a message bit string which represents information about the perceptually important features. This bit string is then used as the input to the MAC generation methods given above.

In the above methods, there are many possible functions $c_{i,l}=f_l(c_{i-1,l}, g_l, k_{i,l})$ which may be used to compute the MAC elements $c_{i,l}$, modulo $p_l$ for $l=1, \ldots, L$. Some possible functions are given below:
1) $c_{i,l}=c_{i-1,l}g_l^{k_{i,l}}$;
2) $c_{i,l}=g \cdot c_{i-1,l}^{k_{i,l}}$; and
3) $c_{i,l}=c_{i-1,l} \oplus g_l \oplus k_{i,l}$.

Further, there are many possible methods for embedding message data bits into an integer m modulo p. One such date embedding method is described below and includes the steps of:

a) defining $N_l$ as the number of bits needed to represent the value of the prime number $p_l$ for $l=1, \ldots, L$;

b) defining $Nm_l$ as the message bit strings that are embedded into the residue number $k_l$ mod $p_l$ with the condition $Nm_l < N_l$;

c) setting a limit on the length of the bit string of the message data block, N, to be $$N \leq \sum_{l=1}^{L} Nm_l;$$

d) repeating the steps e) to g) for $l=1, \ldots, L$;
e) reading the next $Nm_l$ bits of the message bit string;
f) using the $Nm_l$ bits of the message data string as the $Nm_l$ least significant bits of the integer $k_l$ mod $p_l$; and
g) setting the remaining $(N_l - Nm_l)$ bits of the integer $k_l$ mod $p_l$ at random.

At the receiving correspondent, the bits of the message data block can be easily recovered from the residue value m by taking the Nd least significant bits.

In order to embed the message data bit string into L integers $m_l$ modulo $p_l$, for $l=1, \ldots, L$, it is assumed that an integer $m_l$ modulo $p_l$ can be represented using $N_l$-bits. It is further assumed that the message data bit string has a length of $N_s$-bits. The limit on the number of bits $N_s$ of a massage data string when using the embedding method described above is $$N_s < \sum_{l=1}^{L} (N_l - 1).$$

The method is then performed as follows:
a) ordering the elements $\{p_1, p_2, \ldots, p_L\}$ in numerically decreasing order;
b) repeating steps c) and d) for $l=1, \ldots, L$:
c) reading the next $(N_l - 1)$ bits of the message data string; and d) embedding the $(N_l - 1)$ bits of the message data string into the integer $m_l$ modulo p.

The pre-processing stage used prior to embedding a message data bit string into L modulo integers mentioned above is described in the following. First, it is assumed that the message data bit string consists of $N_s$ bits. $[d_{N_B-1}, d_{N_B-2}, \ldots, d_1]$ denotes an $N_s$-bit vector which represents the message data bit-string, where $d_i$ denotes the i-th bit of the data string. At the sending correspondent, the data vector $[d_{N_B-1}, d_{N_B-2}, \ldots, d_1]$ is transformed into another $N_s$-bit vector $[dh_{N_B-1},$ $dh_{N_B-2}, \ldots, dh_1]$ using any isomorphic transformation $h(.)$ such that $[dh_{N_B-1}, dh_{N_B-2}, \ldots, dh_1] = h([dh_{N_B-1}, dh_{N_B-2}, \ldots, dh_1])$.

The bits of the new vector $[dh_{N_B-1}, dh_{N_B-2}, \ldots, dh_1]$ are then embedded into the L integers $m_i$ modulo p, $i=1, \ldots, L$, using the data embedding method described above.

At the receiving correspondent, the vector $[dh_{N_B-1}, dh_{N_B-2}, \ldots, dh_1]$ is first recovered from the integers try modulo p, $i=1, \ldots, L$. The data vector $[d_{N_B1}, d_{N_B2}, \ldots, d_1]$ is then recovered from the vector $[dh_{N_B-1}, dh_{N_B-2}, \ldots, dh_1]$ using $[d_{N_B-1}, d_{N_B-2}, \ldots, d_1] = h^{-1}([dh_{N_B-1}, dh_{N_B-2}, \ldots, dh_1])$.

The advantage of using the pre-processing stage is to ensure that the message data block can be recovered only if all the bits of the vector $[dh_{N_B-1}, dh_{N_B-2}, \ldots, dh_1]$ are obtained, which means, essentially, that an attacker must find all the elements used in the RNS basis $\{p_1, p_2, \ldots, p_L\}$. Thus, partial factorization of the integer $$P = \prod_{l=1}^{L} p_l$$

is not sufficient to break the RNS protocols described above.

In the methods described above, the elements of an RNS basis are selected from a predefined set of prime or relatively prime numbers. Assuming $\{z_1', z_2', \ldots, z_{L'}'\}$ represents a predefined set of prime numbers, then one method of using a code to identify the selected elements used in an RNS basis is to use a code with L' bits. Assuming that the set $\{z_1', z_2', \ldots, z_{L'}'\}$ is ordered in a decreasing value, then there are $2^{L'}$ possible sub-sets of the set $\{z_1', z_2', \ldots, z_{L'}'\}$. Thus, there are $2^{L'}$ possible RNS bases to choose from. The code to identify which sub-set is used is constructed as follows: If the l-th bit of the L' bit code is set to one, this implies that element $z_l'$ is used. If the l-th bit of the L' bit code is set to zero, this implies that element $z_l'$ is not used.

In order to ensure random selection, the L' bit code needs to be generated by a random number generator. Any suitable binary random number generator modulo $2^{L'}$ can be utilized.

As noted above, mathematically "difficult" or "hard" problems are used in the design of cryptographic methods. Such problems include integer factorization and the discrete logarithm problem. The integer factorization problem can be stated as follows: given an integer n, find the prime numbers $\{p_1, p_2, \ldots, p_L\}$ such that $$n = \prod_{l=1}^{L} p_l.$$

The security strength of the above methods is based on hiding the RNS basis $\beta$. The only information an attacker requires about the basis is the number of bits used to represent the ciphertext, $N_C$. The strength of the above methods thus depends on solving the following problem: Given the maximum number of bits used to represent an integer P, $N_C$, find the integer P and the set $\{p_1, p_2, \ldots, p_L\}$ such that $$P = \prod_{l=1}^{L} p_l$$

and $P<2^{N_C}$. Therefore, finding elements $\{p_1, p_2, \ldots, p_L\}$ of the basis $\beta$ is equivalent to integer factorization where only the upper bound of the integer is known. Thus, the security of the RNS-based block cipher is dependent on a well-known mathematically hard problem, where the integer to be factorized is not known and the only information that is known is its upper bound.

Therefore, the security of the above methods are dependent on a problem which is computationally harder than conventional factorization, since the integer value $$P = \prod_{l=1}^{L} p_l$$

is not known. This more difficult problem is what is referred to as "blind factorization" in the above.

It will be understood that the MACs based on blind randomization and factorization described above may be implemented by software stored on a medium readable by a computer and executing as set of instructions on a processor (including a microprocessor, microcontroller, or the like) when loaded into main memory in order to carry out a cryptographic system of secure communications in a computer network. As used herein, a medium readable by a computer includes any form of magnetic, optical, mechanical, laser, or other media readable by a computer, including floppy disks, hard disks, compact disks (CDs), digital versatile disk (DVD), laser disk, magnetic tape, paper tape, punch cards, flash memory, etc.

It is to be understood that the present invention is not limited to the embodiments described above, but encompasses any and all embodiments within the scope of the following claims.

We claim:

1. A computer software product that includes a non-transitory storage medium readable by a processor, the non-transitory storage medium having stored thereon a set of instructions for generating a message authentication code, the instructions comprising:

a) a first set of instructions which, when loaded into main memory and executed by the processor, causes the processor to establish a set of elements $\{p_1, p_2, \ldots, p_L\}$ which are relatively prime with respect to one another, wherein a pair of sending and receiving correspondents agree upon on the set of elements $\{p_1, p_2, \ldots, p_L\}$, which are further considered as a shared secret and which are further used to form a basis $\beta = \{p_1, p_2, \ldots, p_L\}$, the sending and receiving correspondents further agreeing upon an integer $g_l \in Z_{p_l}$ for each element $p_l$, $l=1, \ldots, L$, wherein $Z_p$ denotes the set $\{0, \ldots, p\}$ and L is an integer which denotes the number of prime numbers used in the basis $\beta$, and wherein N is a maximum number of bits of a message data block, wherein N is an integer defined such that a message data bit string length is a multiple of N, the sending and receiving correspondents further agreeing upon an upper limit for the number of bits to be used to represent the message authentication code and an initial vector for a set of message authentication code elements $c_{-1,l}$, $l=1, \ldots, L$;

b) a second set of instructions which, when loaded into main memory and executed by the processor, causes the processor to initialize an integer i as i=0, the following third and fourth sets of instructions then being repeated until all of the message data blocks are processed, and incrementing i at each step, at the sending correspondent;

c) a third set of instructions which, when loaded into main memory and executed by the processor, causes the processor to generate L integer values $k_l$, where $l=1, \ldots, L$, such that $0 \leq k_l < p_l$ from the $i^{th}$ block of the message bit string, at the sending correspondent;

d) a fourth set of instructions which, when loaded into main memory and executed by the processor, causes the processor to compute the message authentication code elements $c_{i,l}$ modulo $p_l$ as $c_{i,l} = f_l(c_{i-1,l}, g_l, k_{i,l})$ for $l=1, \ldots, L$, wherein $f_l(,)$ represents a modulo p function, at the sending correspondent;

e) a fifth set of instructions which, when loaded into main memory and executed by the processor, causes the processor to combine the integer values $c_{u,l}$ for $l=1, \ldots, L$ to form a single integer vector $\{c_{u,1}, c_{u,2}, \ldots, c_{u,L}\}$, wherein u is an integer, at the sending correspondent;

f) a sixth set of instructions which, when loaded into main memory and executed by the processor, causes the processor to convert the integer vector $\{c_{u,1}, c_{u,2}, \ldots, c_{u,L}\}$ into an integer value C using the basis $\beta$ and the Chinese Remainder Theorem, the integer value C being the message authentication code value, at the sending correspondent;

g) a seventh set of instructions which, when loaded into main memory and executed by the processor, causes the processor to append the bit string of the message authentication code integer value, C, to the message bit string and sending the concatenated bit string to the receiving correspondent;

h) an eighth set of instructions which, when loaded into main memory and executed by the processor, causes the processor to obtain the message authentication code integer value C from the received message bit string, at the receiving correspondent;

i) a ninth set of instructions which, when loaded into main memory and executed by the processor, causes the processor to compute the message authentication code elements $c_{u,l}$ modulo $p_l$ as $c_{u,l} = C \bmod p_l$ for $l=1, \ldots, L$, at the receiving correspondent;

j) a tenth set of instructions which, when loaded into main memory and executed by the processor, causes the processor to initialize the integer i as i=0, the following eleventh and twelfth sets of instructions then being repeated until all the received message data blocks are processed, and incrementing i at each step, at the receiving correspondent;

k) an eleventh set of instructions which, when loaded into main memory and executed by the processor, causes the processor to generate L integer values $k_l$, where $l=1, \ldots, L$, such that $0 \leq k_l < p_l$ from the $i^{th}$ block of the received message bit string, at the sending correspondent;

l) a twelfth set of instructions which, when loaded into main memory and executed by the processor, causes the processor to compute the message authentication code elements $rc_{i,l}$ modulo $p_l$ as $rc_{i,l} = f_l(rc_{i-1,l}, g_l, k_{i,l})$ for $l=1, \ldots, L$, at the sending correspondent; and m) a thirteenth set of instructions which, when loaded into main memory and executed by the processor, causes the processor to authenticate the received message if $c_{u,l} = rc_{u,l}$ for all l.

2. The computer software product as recited in claim 1, wherein the integers $g_l$ are part of the shared secret key.

3. The computer software product as recited in claim 1, wherein the integers $g_l$ are made public.

4. The computer software product as recited in claim 1, wherein the modulo p function of said fourth set of instructions is computed as $c_{i,l} = c_{i-1,l} g_l^{k_{i,l}}$.

5. The computer software product as recited in claim 1, wherein the modulo p function of said fourth set of instructions is computed as $c_{i,l} = g \cdot c_{i-1,l}^{k_{i,l}}$.

6. The computer software product as recited in claim 1, wherein the modulo p function of said fourth set of instructions is computed as $c_{i,l} = c_{i-1,l} \oplus g_l \oplus k_{i,l}$.

7. The computer software product as recited in claim 1, wherein the third and eleventh sets of instructions comprise a data embedding method, comprising:
   a) a fourteenth set of instructions which, when loaded into main memory and executed by the processor, causes the processor to define M as an integer value of a bit string of a block of a message;
   b) a fifteenth set of instructions which, when loaded into main memory and executed by theprocessor, causes the processor to define (N+1) as a number of bits needed to represent an integer $$M_{max} = \prod_{l=1}^{L} p_l;$$

c) a sixteenth set of instructions which, when loaded into main memory and executed by the processor, causes the processor to set a limit on the length of the bit string of the message block to be N ; and
   d) a seventeenth set of instructions which, when loaded into main memory and executed by the processor, causes the processor to generate from the integer value M, L integer values $k_l$, such that $0 \leq k_l < p_l$, where l=1, . . . , L using, $k_l$=M mod $p_l$, for l=1, . . . , L, wherein the value of N is dependent on the data embedding method, the data embedding method also being agreed upon by the sending and receiving correspondents.

8. The computer software product as recited in claim 1, wherein the third and eleventh sets of instructions comprise a data embedding method, comprising:
   a) a fourteenth set of instructions which, when loaded into main memory and executed by the processor, causes the processor to define $N_l$ as a number of bits needed to represent a value of a prime number $p_l$ for l=1, . . . , L;
   b) a fifteenth set of instructions which, when loaded into main memory and executed by the processor, causes the processor to define $Nm_l$ as the message bit strings that are embedded into the residue number $k_l$ mod $p_l$ with the condition $Nm_l < N_l$;
   c) a sixteenth set of instructions which, when loaded into main memory and executed by the processor, causes the processor to set a limit on the length of the bit string of the message data block N to be $$N \leq \sum_{l=1}^{L} Nm_l;$$

d) a seventeenth set of instructions which, when loaded into main memory and executed by the processor, causes the processor to repeat the following eighteenth through twentieth sets of instructions for l=1, . . . , L;
   e) an eighteenth set of instructions which, when loaded into main memory and executed by the processor, causes the processor to read the next $Nm_l$ bits of the message bit string;
   f) a nineteenth set of instructions which, when loaded into main memory and executed by the processor, causes the processor to use the $Nm_l$ bits of the message data string to generate the $Nm_l$ bits of the integer $k_l$ mod $p_l$; and
   g) a twentieth set of instructions which, when loaded into main memory and executed by the processor, causes the processor to set the remaining ($N_l$–$Nm_l$) bits of the integer $k_l$ mod $p_l$ at random, wherein the value of N is dependent on the data embedding method, the data embedding method also being agreed upon by the sending and receiving correspondents.

9. A computer software product that includes a non-transitory storage medium readable by a processor, the non-transitory storage medium having stored thereon a set of instructions for generating a message authentication code using blind randomization, the instructions comprising:
   a) a first set of instructions which, when loaded into main memory and executed by the processor, causes the processor to establish a set of elements $\{p_1', p_2', \ldots, p_{L'}'\}$ which are relatively prime with respect to one another, wherein a pair of sending and receiving correspondents agree upon on the set of elements $\{p_1', p_2', \ldots, p_{L'}'\}$ and which are further considered as a shared secret, the sending and receiving correspondents further agreeing upon an integer $g_l \in Z_{p_l}$ for each element $p_l$, l=1, . . . , L , wherein $Z_p$ denotes the set $\{0, \ldots, p\}$ and L is an integer that denotes the number of prime numbers used in a basis $\beta$, and wherein N is a maximum number of bits of a message data block, and wherein the message data bit string is a multiple of N, the sending and receiving correspondents further agreeing upon an upper limit for the number of bits to be used to represent the message authentication code and an initial vector for a set of message authentication code elements $c_{-1,l}$, l=1, . . . , L, the sending and receiving correspondents further agreeing on a list of codes, wherein each code identifies a different sub-set of (L−1) elements out of a set of L' shared secret elements, the sending and receiving correspondents further agreeing upon an element $p_L$ of the set $\{p_1', p_2', \ldots, p_{L'}'\}$, the element being used to carry information about the code used by the sending correspondent to select a sub-set of the elements $\{p_1', p_2', \ldots, p_{L'}'\}$ which are used to form the basis $\beta$, wherein the number of codes is ($p_L$−1);
   b) a second set of instructions which, when loaded into main memory and executed by the processor, causes the processor to select a code at random from the list of agreed upon to select (L−1) elements $\{p_1, p_2, \ldots, p_{L-1},\}$ from the elements $\{p_1', p_2', \ldots, p_{L'}'\}$ to form the basis $\beta = \{p_1, p_2, \ldots, p_{L-1}, p_L\}$, at the sending correspondent;
   c) a third set of instructions which, when loaded into main memory and executed by the processor, causes the processor to initialize an integer i as i=0, the following fourth and fifth sets of instructions then being repeated until all the message data blocks are processed, and incrementing i at each step, at the sending correspondent;
   d) a fourth set of instructions which, when loaded into main memory and executed by the processor, causes the processor to generate (L−1) integer values $k_{i,l}$, where l=1, . . . , (L−1) such that $0 \leq k_{i,l} < p_l$, from the i-th block of the message bit string, at the sending correspondent;
   e) a fifth set of instructions which, when loaded into main memory and executed by the processor, causes the processor to compute the message authentication code elements $c_{i,l}$ modulo $p_l$ as $c_{i,l}=f_l(c_{i-1,l}, g_l, k_{i,l})$ for $l=1, \ldots, (L-1)$, where $f_l(,)$ represents a modulo p function, at the sending correspondent;

f) a sixth set of instructions which, when loaded into main memory and executed by the processor, causes the processor to embed the bit strings of the code used by the sending correspondent to select the (L−1) elements $\{p_1, p_2, \ldots, p_{L-1}\}$ into the integer value $c_{u,L}$, such that $0 \leq c_{u,L} < p_L$, at the sending correspondent;

g) a seventh set of instructions which, when loaded into main memory and executed by the processor, causes the processor to combine the integer values $c_{u,l}$ for $l=1, \ldots, L$ to form a single integer vector $\{c_{u,1}, c_{u,2}, \ldots, c_{u,L}\}$, at the sending correspondent;

h) an eighth set of instructions which, when loaded into main memory and executed by the processor, causes the processor to convert the integer vector $\{c_{u,1}, c_{u,2}, \ldots, c_{u,L}\}$ into an integer value C using the basis β and the Chinese Remainder Theorem, the integer value C being the message authentication code value, at the sending correspondent;

i) a ninth set of instructions which, when loaded into main memory and executed by the processor, causes the processor to append the bit string of the message authentication code integer value, C, to the message bit string and sending the concatenated bit string to the receiving correspondent;

j) a tenth set of instructions which, when loaded into main memory and executed by the processor, causes the processor to obtain the message authentication code integer value C from the received message bit string, at the receiving correspondent;

k) an eleventh set of instructions which, when loaded into main memory and executed by the processor, causes the processor to compute the message authentication code elements $c_{u,L}$ modulo $p_l$ as $c_{u,L}=C \bmod p_l$ for $l=1, \ldots, L$, at the receiving correspondent;

l) a twelfth set of instructions which, when loaded into main memory and executed by the processor, causes the processor to recover the code used to define the set $\{p_1, p_2, \ldots, p_{L-1}\}$ from the value $c_{u,L}$, at the receiving correspondent;

m) a thirteenth set of instructions which, when loaded into main memory and executed by the processor, causes the processor to compute the message authentication code elements $c_{u,l}$ modulo $p_l$ as $c_{u,l}=C \bmod p_l$ for $l=1, \ldots, (L-1)$, at the receiving correspondent;

n) a fourteenth set of instructions which, when loaded into main memory and executed by the processor, causes the processor to initialize the integer i as i=0, the following fifteenth and sixteenth sets of instructions then being repeated until all the received message data blocks are processed, and incrementing i at each step, at the receiving correspondent;

o) a fifteenth set of instructions which, when loaded into main memory and executed by the processor, causes the processor to generate (L−1) integer values $k_{i,l}$, where $l=1, \ldots, (L-1)$, such that $0 \leq k_{i,l} < p_l$, from the i-th block of the message bit string, at the receiving correspondent;

p) a sixteenth set of instructions which, when loaded into main memory and executed by the processor, causes the processor to compute the message authentication code elements $rc_{i,l}$ modulo $p_l$ as $rc_{i,l}=f_l(rc_{i-1,l}, g_l, k_{i,l})$ for $l=1, \ldots, (L-1)$, at the receiving correspondent); and q) a seventeenth set of instructions which, when loaded into main memory and executed by the processor, causes the processor to authenticate the received message if $c_{u,l}=rc_{u,l}$ for $l=1, \ldots, (L-1)$.

10. The computer software product as recited in claim 9, wherein the fourth, sixth and fourteenth sets of instructions comprise a data embedding method, comprising:

a) an eighteenth set of instructions which, when loaded into main memory and executed by the processor, causes the processor to define $N_l$ as a number of bits needed to represent the value of the prime number $p_l$ for $l=1, \ldots, (L-1)$;

b) a nineteenth set of instructions which, when loaded into main memory and executed by the processor, causes the processor to define $Nm_l$ as the message bit strings that are embedded into the residue number $k_l \bmod p_l$ with the condition $Nm_l < N_l$;

c) a twentieth set of instructions which, when loaded into main memory and executed by the processor, causes the processor to set a limit on the length of the bit string of the message data block N to be $$N \leq \sum_{l=1}^{L} Nm_l;$$

d) a twenty-first set of instructions which, when loaded into main memory and executed by the processor, causes the processor to repeat the following twenty-second through twenty-fourth sets of instructions for $l=1, \ldots, (L-1)$;

e) a twenty-second set of instructions which, when loaded into main memory and executed by the processor, causes the processor to read the next $Nm_l$ bits of the message bit string;

f) a twenty-third set of instructions which, when loaded into main memory and executed by the processor, causes the processor to use the $Nm_l$ bits of the message data string to generate the $Nm_l$ bits of the integer $k_l \bmod p_l$; and g) a twenty-fourth set of instructions which, when loaded into main memory and executed by the processor, causes the processor to set the remaining $N_l - Nm_l$) bits of the integer $k_l \bmod p_l$ at random, wherein the value of N is dependent on the data embedding method, the data embedding method also being agreed upon by the sending and receiving correspondents.

11. The computer software product as recited in claim 9, wherein the integers $g_l$ are part of the shared secret key.

12. The computer software product as recited in claim 11, wherein the integers $g_l$ are made public.

13. The computer software product as recited in claim 9, wherein the fourth, sixth and fourteenth sets of instructions comprise a data embedding method comprising:

a) an eighteenth set of instructions which, when loaded into main memory and executed by the processor, causes the processor to define M as an integer value of a bit string of a block of a message;

b) a nineteenth set of instructions which, when loaded into main memory and executed by the processor, causes the processor to define (N+1) as a number of bits needed to represent an integer $$M_{max} = \prod_{l=1}^{L-1} p_l;$$

c) a twentieth set of instructions which, when loaded into main memory and executed by the processor, causes the processor to set a limit on the length of the bit string of the message block to be N; and d) a twenty-first set of instructions which, when loaded into main memory and executed by the processor, causes the processor to generate from the integer value M, (L−1) integer values $k_l$, such that $0 \leq k_l < p_l$ where l=1, ..., (L−1) using, $k_l$=M mod $p_l$, for l=1, ..., (L−1), wherein the value of N is dependent on the data embedding method, the data embedding method also being agreed upon by the sending and receiving correspondents.

14. A computer software product that includes a non-transitory storage medium readable by a processor, the non-transitory storage medium having stored thereon a set of instructions for generating a message authentication code using blind randomization, the instructions comprising:

a) a first set of instructions which, when loaded into main memory and executed by the processor, causes the processor to establish a set of elements $\{p_1, p_2, \ldots, p_L\}$ which are relatively prime with respect to one another, wherein sending and receiving correspondents agree upon on the set of elements $\{p_1, p_2, \ldots, p_L\}$, the set of elements further being considered as a shared secret and which are further used to form a basis $\beta_s = \{p_1, p_2, \ldots, p_L\}$, the sending and receiving correspondents further agreeing upon an integer $g_l \in Z_{p_l}$ for each element $p_l$, where l=1, ..., L, the sending and receiving correspondents further agreeing upon an upper limit for the number of bits to be used to represent the message authentication code and an initial vector for the message authentication code elements $c_{-1,l}$, l=1, ..., L ;

b) a second set of instructions which, when loaded into main memory and executed by the processor, causes the processor to select elements $\{q_1', q_2', \ldots, q_{J'}'\}$, wherein J' is an integer and J'>0, the elements being relatively prime with respect to one another and further being relatively prime with respect to the secret elements $\{p_1, p_2, \ldots, p_L\}$, the elements $\{q_1', q_2', \ldots, q_{J'}'\}$ being known to the sending correspondent only, at the sending correspondent;

c) a third set of instructions which, when loaded into main memory and executed by the processor, causes the processor to select a random sub-set of elements $\{q_{i,1}, q_{i,2}, \ldots, q_{i,j}\}$ from the set $\{q_1', q_2', \ldots, q_{J'}'\}$, wherein the number of bits needed to represent $$\prod_{l=1}^{L} p_l \prod_{j=1}^{J} q_j$$

is within the upper limit agreed upon by the sending and receiving correspondents, at the sending correspondent;

d) a fourth set of instructions which, when loaded into main memory and executed by the processor, causes the processor to form the basis $\beta = \{p_1, p_2, \ldots, p_L, q_1, q_2, \ldots, q_J\}$ using the elements $\{p_1, p_2, \ldots, p_{L-1}\}$ and the elements $\{q_1, q_2, \ldots, q_J\}$, at the sending correspondent;

e) a fifth set of instructions which, when loaded into main memory and executed by the processor, causes the processor to initialize an integer i as i=0, then repeating the following sixth and seventh sets of instructions until all of the message data blocks are processed, and incrementing i at each step, at the sending correspondent;

f) a sixth set of instructions which, when loaded into main memory and executed by the processor, causes the processor to generate L integer values $k_l$, where l=1, ..., L, such that $0 \leq k_l < p_l$ from the $i^{th}$ block of the received message bit string,pat the sending correspondent;

g) a seventh set of instructions which, when loaded into main memory and executed by the processor, causes the processor to compute computing the message authentication code elements $c_{i,l}$ modulo $p_l$ as $c_{i,l}=f_l(c_{i-1,l}, g_l, k_{i,l})$ for l=1, ..., L, wherein $f_l(,)$ represents a modulo p function, at the sending correspondent;

h) an eighth set of instructions which, when loaded into main memory and executed by the processor, causes the processor to generate generating J random values $r_j$, where j=1, ..., J, such that $0 \leq r_j < q_j$ for j=1, J, at the sending correspondent;

i) a ninth set of instructions which, when loaded into main memory and executed by the processor, causes the processor to combine the integer values $c_{u,l}$ for l=1, ..., L and the values $r_j$ for j=1, ..., J to form a single integer vector $\{c_{u,1}, c_{u,2}, \ldots, c_{u,L}, r_1, r_2, \ldots, r_j\}$, at the sending correspondent;

j) a tenth set of instructions which, when loaded into main memory and executed by the processor, causes the processor to convert the integer vector $\{c_{u,1}, c_{u,2}, \ldots, c_{u,L}, r_1, r_2, \ldots, r_j\}$ into an integer value C using the basis $\beta$ and the Chinese Remainder Theorem, the integer value C being the message authentication code value, at the sending correspondent;

k) an eleventh set of instructions which, when loaded into main memory and executed by the processor, causes the processor to append appending the bit string of the message authentication code integer value, C, to the message bit string and sending the concatenated bit string to the receiving correspondent;

l) a twelfth set of instructions which, when loaded into main memory and executed by the processor, causes the processor to obtain the message authentication code integer value C from the received message bit string, at the receiving correspondent;

m) a thirteenth set of instructions which, when loaded into main memory and executed by the processor, causes the processor to compute the message authentication code elements $c_{u,l}$ modulo $p_l$ as $c_{u,l}=C$ mod $p_l$ for l=1, ..., L at the receiving correspondent;

n) a fourteenth set of instructions which, when loaded into main memory and executed by the processor, causes the processor to initialize the integer i as i=0, then repeating the following fifteenth and sixteenth sets of instructions until all of the received message data blocks are processed, and incrementing i at each step, at the receiving correspondent;

o) a fifteenth set of instructions which, when loaded into main memory and executed by the processor, causes the processor to generate L integer values $k_l$, where l=1, ..., L, such that $0 \leq k_l < p_l$ from the $i^{th}$ block of the received message bit string, at the receiving correspondent;

p) a sixteenth set of instructions which, when loaded into main memory and executed by the processor, causes the processor to compute the message authentication code elements $rc_{i,l}$ modulo $p_l$ as $rc_{i,l}=f_l(rc_{i-1,l}, g_l, k_{i,l})$ for l=1, ..., L, at the receiving correspondent; and q) a seventeenth set of instructions which, when loaded into main memory and executed by the processor, causes the processor to authenticate the received message if $c_{u,l}=rc_{u,l}$ for all l.

15. The computer software product as recited in claim 14, wherein the integers $g_l$ are part of the shared secret key.

16. The computer software product as recited in claim 14, wherein the integers $g_l$, are made public.

17. The computer software product as recited in claim 14, wherein the modulo p function of said fourth set of instructions is computed as $c_{i,l} = c_{i-1,l} g_l^{k_{i,l}}$.

18. The computer software product as recited in claim 14, wherein the modulo p function of said fourth set of instructions is computed as $c_{i,l} = g \cdot c_{i-1,l}^{k_{i,l}}$.

19. The computer software product as recited in claim 14, wherein the modulo p function of said fourth set of instructions is computed as $c_{i,l} = c_{i-1,l} \oplus g_l \oplus k_{i,l}$.

20. The computer software product as recited in claim 14, wherein the sixth and fifteenth sets of instructions comprise a data embedding method comprising:

a) an eighteenth set of instructions which, when loaded into main memory and executed by the processor, causes the processor to define M as an integer value of a bit string of a block of a message;

b) a nineteenth set of instructions which, when loaded into main memory and executed by the processor, causes the processor to define (N+1) as a number of bits needed to represent an integer $$M_{max} = \prod_{l=1}^{L-1} p_l;$$

c) a twentieth set of instructions which, when loaded into main memory and executed by the processor, causes the processor to set a limit on the length of the bit string of the message block to be N; and d) a twenty-first set of instructions which, when loaded into main memory and executed by the processor, causes the processor to generate from the integer value M, (L−1) integer values $k_l$, such that $0 \leq k_l < p_l$ where l=1, . . . , (L−1) using, $k_l = M \bmod p_l$, for l=1, . . . , (L−1), wherein the data embedding method is agreed upon by the sending and receiving correspondents.

* * * * *